United States Patent
Muneoka et al.

(10) Patent No.: US 9,056,774 B2
(45) Date of Patent: Jun. 16, 2015

(54) ALUMINUM NITRIDE POWDER AND METHOD OF PRODUCING THE SAME

(75) Inventors: Takatoshi Muneoka, Shunan (JP); Kazutaka Watanabe, Shunan (JP)

(73) Assignee: TOKUYAMA CORPORATION, Shunan-Shi (JP)

( * ) Notice: Subject to any disclaimer, the term of this patent is extended or adjusted under 35 U.S.C. 154(b) by 71 days.

(21) Appl. No.: 13/989,902

(22) PCT Filed: Nov. 30, 2011

(86) PCT No.: PCT/JP2011/077656
§ 371 (c)(1),
(2), (4) Date: May 28, 2013

(87) PCT Pub. No.: WO2012/077551
PCT Pub. Date: Jun. 14, 2012

(65) Prior Publication Data
US 2013/0244036 A1    Sep. 19, 2013

(30) Foreign Application Priority Data

Dec. 6, 2010 (JP) ................................. 2010-271923

(51) Int. Cl.
*C01B 21/072* (2006.01)

(52) U.S. Cl.
CPC ....... *C01B 21/0726* (2013.01); *Y10T 428/2982* (2015.01); *C01P 2004/03* (2013.01); *C01P 2004/61* (2013.01); *C01P 2002/77* (2013.01); *C01P 2004/32* (2013.01); *C01P 2006/32* (2013.01); *C01P 2006/80* (2013.01)

(58) Field of Classification Search
CPC ..................... C01B 21/0726; Y10T 428/2982; C01P 2004/03; C01P 2004/61; C01P 2002/77; C01P 2004/32; C01P 2006/32; C01P 2006/80

USPC ........... 428/402; 423/409, 412; 264/125, 332; 419/23, 34, 45, 57; 501/98.4
See application file for complete search history.

(56) References Cited

U.S. PATENT DOCUMENTS

| 4,615,863 | A | * | 10/1986 | Inoue et al. | ..................... 419/23 |
| 5,114,695 | A | * | 5/1992 | Jain et al. | ..................... 423/411 |
| 2005/0173094 | A1 | * | 8/2005 | Mori | ..................... 164/519 |

FOREIGN PATENT DOCUMENTS

| JP | 60-65768 A |   | 4/1985 |
| JP | 61-155209 A |   | 7/1986 |
| JP | 04-059609 | * | 2/1992 |
| JP | 4-59609 A |   | 2/1992 |
| JP | 05-147909 | * | 6/1993 |
| JP | 5-147909 A |   | 6/1993 |
| JP | 5-221618 A |   | 8/1993 |
| JP | 9-52704 A |   | 2/1997 |
| JP | 2006-199541 A |   | 8/2006 |
| WO | WO03/097527 | * | 11/2003 |
| WO | WO 03/097527 A1 |   | 11/2003 |

OTHER PUBLICATIONS

International Search Report issued in PCT/JP2011/077656, mailed on Feb. 14, 2012.

* cited by examiner

*Primary Examiner* — Leszek Kiliman
(74) *Attorney, Agent, or Firm* — Birch, Stewart, Kolasch & Birch, LLP

(57) ABSTRACT

[Problem] To provide a method of producing aluminum nitride that has high conducting property and can be excellently filled and is useful as a filler for heat-radiating materials, and an aluminum nitride powder obtained by the same method.

3 Claims, 1 Drawing Sheet

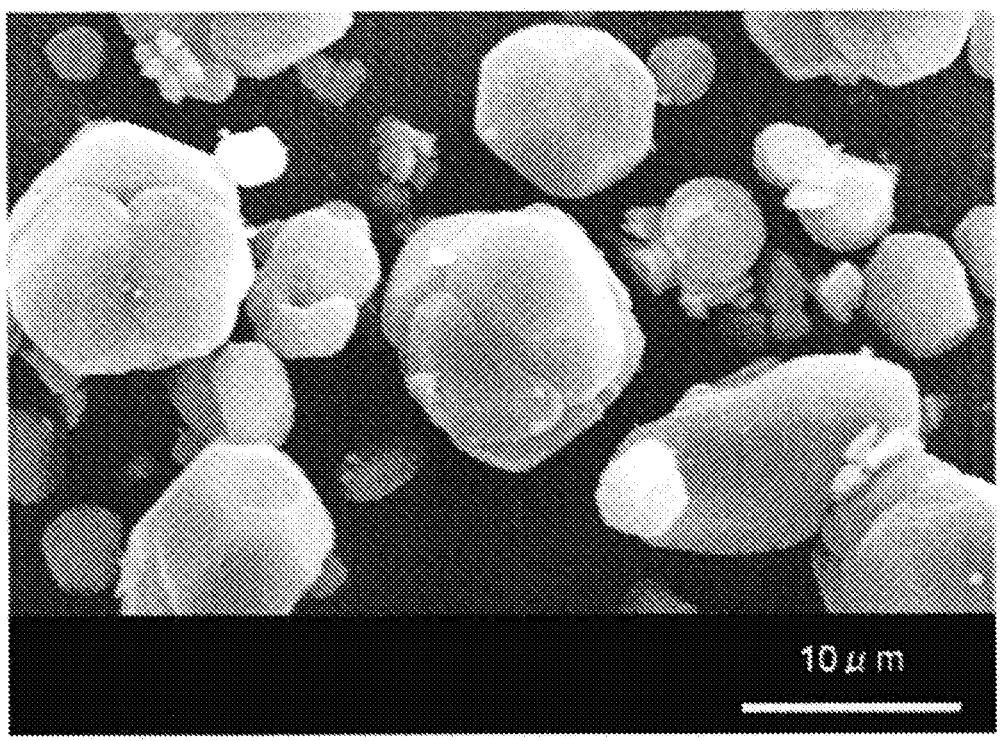

ALUMINUM NITRIDE POWDER AND METHOD OF PRODUCING THE SAME

TECHNICAL FIELD

This invention relates to an aluminum nitride powder that can be favorably used as a filler for heat radiating materials for improving heat radiating property by being filled in a resin, a grease, an adhesive or a coating material, and to a method of producing the same.

BACKGROUND ART

The aluminum nitride has an excellent electrically insulating property and a high thermal conductivity, and it has been expected that a materials such as resin, grease, adhesive and coating material filled with a sintered product or a powder thereof can be used as heat radiating materials featuring a high thermal conductivity.

In order to improve the thermal conductivity of the heat radiating materials, it is important to densely fill the matrix such as resin with a filler having a high thermal conductivity. For this purpose, it has been strongly urged to provide an aluminum nitride powder of a high sphericalness having a grain size of from about several microns to several hundreds of microns.

The aluminum nitride powder has, usually, been produced by an alumina reductive nitridation method which nitrides the alumina in the presence of carbon, a direct nitridation method which reacts aluminum directly with nitrogen, and a gas-phase method which reacts alkylaluminum with ammonia and, thereafter, heats them.

Of them, the aluminum nitride particles obtained by the reductive nitridation method and by the gas-phase method have shapes close to a sphere but their grain sizes are still of the order of sub-microns.

According to the direct nitridation method, on the other hand, the aluminum nitride powder is obtained through the pulverization and classification, making it possible to obtain the aluminum nitride powder having grain sizes of from about several microns to several hundreds of microns. However, the obtained particles are irregular particles having low sphericalness. Therefore, the aluminum nitride powder obtained by the above method cannot be highly densely filled in the resin.

As a method of efficiently obtaining an aluminum nitride powder of a high sphericalness, on the other hand, there has been known a method of producing an aluminum nitride powder by firing a mixed powder of an alumina powder, a powder of an alkaline earth metal compound or a rare earth compound and a carbon powder in a non-oxidizing atmosphere containing nitrogen (see patent document 1).

This method is to form the aluminum nitride at a low temperature of not higher than 1500° C. by utilizing the action of the alkaline earth metal compound or the rare earth compound for promoting the nitridation reaction.

The aluminum nitride particles obtained by the above method have a high sphericalness but their grain sizes are about 1 μm at the greatest, and relatively large grain sizes of the order of several microns have not been realized yet. According to the above method, further, it is difficult to control the grain size of the aluminum nitride powder that is obtained. For example, when the alkaline earth metal compound is used, it has been confirmed that the obtained aluminum nitride powder contains coarse particles of sizes which are unnecessarily large. Besides, it is difficult to separate such coarse particles from the highly adhesive aluminum nitride powder of a grain size of about 1 μm.

PRIOR ART DOCUMENT

Patent Document

Patent document 1: JP-A-5-221618

OUTLINE OF THE INVENTION

Problems that the Invention is to Solve

It is, therefore, an object of the present invention to provide a method of producing an aluminum nitride powder comprising relatively large particles of an average grain size of from several microns to several hundreds of microns having a high sphericalness best suited for use as a filler and having a low content of coarse particles maintaining good productivity, and an aluminum nitride powder obtained by the above method.

Means for Solving the Problems

In order to solve the above problems, the present inventors have conducted keen research, have found that an aluminum nitride powder of having a high sphericalness, the above desired grain size and a low content of coarse particles can be obtained with good productivity by firing a mixed powder of a powder of alumina or hydrated alumina as the Al source, a powder of a rare earth metal compound (sintering assistant) and a powder of carbon (reducing agent) in a nitrogen-containing atmosphere in a predetermined high-temperature region, but using the powder of the Al source that has a specified primary grain size and using the powder of the rare earth metal compound that has a grain size larger by a specified number of times than the primary grain size of the powder of the Al source, and have completed the present invention.

That is, according to the present invention, there is provided a method of producing an aluminum nitride powder including following steps of:

preparing a powder of alumina or hydrated alumina having a primary grain size of 0.001 to 6 μm as an Al source, a powder of a rare earth metal compound having an average grain size ($D_{50}$) in a range of 2 to 80 μm, the average grain size ($D_{50}$) thereof being not less than 6 times as great as the primary grain size of the Al source, and a carbon powder, mixing the powder of the Al source, the powder of the rare earth metal compound and the carbon powder together, and reducing and nitriding the Al source by holding the mixed powder in a nitrogen-containing atmosphere at a temperature of 1620 to 1900° C. for not less than 2 hours.

In the production method of the present invention, it is desired that the powder of the rare earth metal element compound is used in an amount of 0.5 to 50 parts by mass and the carbon powder is used in an amount of 35 to 50 parts by mass per 100 parts by mass of the Al source.

According to the above production method, it is allowed to obtain an aluminum nitride powder having an average grain size ($D_{50}$) of 6 to 280 μm, and containing coarse particles of a grain size of not less than 5 times as great as the average grain size ($D_{50}$) thereof in an amount of not more than 10% calculated as volume.

Here, the primary grain size of the powder of the Al source stands for an arithmetic mean value of when not less than 30 particles of the alumina powder or the hydrated alumina powder are measured for their grain sizes in a predetermined direction on a transmission-type electron microphotograph thereof.

Further, the average grain size ($D_{50}$) stands for a grain size of when the cumulative volume is 50% in the grain size profile as measured by the laser diffraction/light scattering method. Namely, the grain size in this case is not a primary grain size but is a secondary grain size (size of aggregated particles).

Effects of the Invention

According to the production method of the present invention, it is allowed to obtain, maintaining good productivity, an aluminum nitride powder having a relatively large average grain size (6 μm to 280 μm) which is best suited for use as a filler and a high sphericalness, containing little coarse particles that have grain sizes of not less than 5 times as great as the average grain size ($D_{50}$) thereof.

That is, the present invention uses a powder of alumina or hydrated alumina having a small primary grain size as the Al source and, at the same time, uses a rare earth metal compound having an average grain size larger than that of the powder of the Al source as the sintering assistant. In the invention, therefore, the particles of the Al source deposit on the individual particles of the rare earth compound so as to cover the surfaces thereof. Therefore, the particles of the Al source on the surfaces of the particles of the rare earth compound gradually melt and are reductively nitrided in the nitrogen-containing atmosphere in a predetermined high-temperature region (1620 to 1900° C.). As a result, the obtained aluminum nitride assumes a grain size that is correlated to the grain size of the rare earth compound, and there is obtained an AlN powder having a relatively large grain size as described above.

It will, therefore, be understood that in the present invention, it is allowed to control the grain size of the obtained AlN by adjusting the grain size of the rare earth compound. As a result, there is obtained an AlN powder of which the particles have a high sphericalness close to a spherical shape forming little coarse particles.

The AlN powder having the above-mentioned particle structure can be highly densely filled in a variety of resins and greases, and exhibits a high thermal conductivity enabling them to be used as heat-radiating materials.

BRIEF DESCRIPTION OF THE DRAWING

FIG. 1 is an electron microphotograph showing the structure of particles in an AlN powder obtained in Example 1.

MODE FOR CARRYING OUT THE INVENTION

The production method of the present invention produces an aluminum nitride (AlN) powder by the reductive nitridation method by using a powder of the Al source, a powder of a sintering assistant (rare earth metal compound) and a carbon powder (reducing agent). Namely, a mixed powder thereof is nitrided and reduced by being fired in a nitrogen-containing atmosphere at a predetermined high temperature so as to produce an AlN powder. As required, the decarbonization treatment may be executed after the nitridation and reduction.
<Powder of Al Source>

In the invention, an alumina or a hydrated alumina is used as the Al source of AlN.

The Al source may be any alumina having a crystal structure such as of α, γ, θ, δ, η, κ or χ, or may be any hydrated alumina such as boehmite, diaspore, gibbsite, bayerite or toddite which, upon heating, is dehydrated and is finally transited wholly or partly into an α-alumina. They can be used in a single kind or as a mixture of two or more kinds.

In the invention, there are preferably used α-alumina, γ-alumina and boehmite which have particularly high reactivities and are easy to control.

The alumina or the hydrated alumina used as the Al source is in the form of a powder with its primary grain size being 0.001 to 6 μm, preferably, 0.01 to 4 μm and, more preferably, 0.1 to 2 μm. Namely, if the primary grain size is not in the above range, the reductive nitridation reaction does not proceed homogeneously, and the obtained AlN powder contains coarse particles in increased amounts.
<Carbon>

The carbon used in the present invention works as a reducing agent, and may be a carbon black or a graphite powder. As the carbon black, there can be preferably used furnace black, channel black or acetylene black. It is desired that the carbon black that is used has a BET specific surface area of 0.01 to 500 $m^2/g$.
<Sintering Assistant>

The present invention uses a rare earth metal compound as the sintering assistant.

In the rare earth metal compound, the rare earth metal may be yttrium, lanthanum, cerium, praseodymium and terbium. The compound thereof may be an oxide, a carbide, or a halide (e.g., fluoride) thereof. The compounds containing these rare earth metals maybe used in one kind or in a plurality of kinds in combination.

Further, the rare earth metal compound may be the one that is capable of forming an oxide, a carbide or a halide of the rare earth metal exemplified above through the reductive nitridation. For example, there can be used a carbonate, a nitrate, an acetate or a hydroxide of a rare earth metal.

Among such rare earth metal compounds according to the present invention, there can be preferably used those that are capable of melting together with the alumina at 1200 to 1900° C. and, specifically, at 1300 to 1800° C., such as yttrium oxide. If, for example, there is used a compound that is capable of melting with the alumina at a temperature of lower than 1200° C., the alumina particles tend to be aggregated together. If a compound having the above temperature in excess of 1900° C. is used, on the other hand, it becomes difficult to obtain the particles having a high sphericalness.

As required, further, the surfaces of the above rare earth metal compound may be treated with, for example, a fatty acid in a customary manner.

It is, further, desired that the above rare earth compound has an average grain size ($D_{50}$) in a range of 2 to 80 μm, preferably, 3 to 65 μm and, more preferably, 4 to 50 μm to adjust the obtained AlN powder so as to possess a relatively large size. This is because in the invention as described earlier, the grain size of the rare earth metal compound is correlated to the grain size of the obtained AlN powder.

In the invention, in order for the grain size of the rare earth metal compound to be correlated to the grain size of the obtained AlN powder, the average grain size ($D_{50}$) of the rare earth compound must be in a range of not less than 6 times, preferably, not less than 8 times and, more preferably, not less than 10 times as large as the primary grain size of the Al source. That is, since the grain size of the rare earth metal compound is considerably larger than that of the particles of the Al source, the particles of the Al source deposit on the surfaces of the particles of the rare earth metal compound so as to cover the large individual particles of the rare earth metal compound and in this state, the reductive nitridation reaction takes place. As a result, the grain size of the obtained AlN powder is close to the grain size of the particles of the rare earth metal compound, and the sphericalness becomes high.

If the above average grain size ($D_{50}$) lies outside the above range of multiples relative to the primary grain size of the alumina, then the alumina is not homogeneously reduced or nitrided arousing such problems that the obtained aluminum nitride powder assumes a decreased sphericalness, it becomes difficult to control the grain size of the obtained aluminum nitride powder and the content of coarse particles increases.

Here, if the grain size of the rare earth metal compound is excessively larger than that of the particles of the Al source, it is probable that the reductive nitridation reaction does not take place homogeneously. It is, therefore, desired that the above compound has an average grain size ($D_{50}$) that is not more than 150 times as large as the primary grain size of the Al source and yet lies within the above-mentioned range.

In the above-mentioned rare earth metal compound powder, further, it is desired that the coarse particles having grain sizes of not less than 5 times as large as the average grain size ($D_{50}$) are contained in an amount calculated as volume of not more than 5%, preferably, not more than 3% and, more preferably, not more than 1% from the standpoint of obtaining the AlN powder which has further suppressed content of coarse particles.

In the present invention, it is also allowable to use other sintering assistant if its amount is not so large as to impair the action of the rare earth metal compound powder of the above-mentioned relatively large size for adjusting the grain size. As the other sintering assistant, there can be used an oxide, a carbide and a halide of an alkaline earth metal and, typically, a calcium oxide that is capable of melting together with the alumina at 1200 to 1900° C. and, preferably, at 1300 to 1800° C.

<Preparation of a Mixed Starting Powder>

In the present invention, the above starting powders are mixed together and are fed to the step of reductive nitridation that will be described later.

Though there is no specific limitation, the mixed powder is, usually, prepared by using a mixing machine such as a blender, a mixer or a ball mill.

The powder of the Al source used as a starting material may have a primary grain size lying in the above-mentioned range. Here, the reductive nitridation reaction takes place with the primary particles as the unit and there is no specific limitation on the secondary grain size thereof. If the particles are aggregated together to assume excessively large sizes, however, it becomes probable that the reductive nitridation reaction may not take place homogeneously. Prior to being mixed with other starting powders, therefore, it is desired that the powder of the Al source has been suitably pulverized so that the secondary grain size thereof (i.e., size of the aggregated particles) is not more than ¼ and, more preferably, not more than ⅙ times as large as the grain size of the rare earth metal compound that is to be added.

In the above mixed powder, it is desired that the starting powders are used at ratios described below from the standpoint of carrying out the reductive nitridation reaction quickly and homogeneously in the mode as described above.

Namely, the powder of the rare earth metal compound is used in an amount of 0.5 to 50 parts by mass and, specifically, 1 to 25 parts by mass, and the carbon powder is used in an amount of 35 to 50 parts by mass, preferably, 37 to 46 parts by mass and, more preferably, 38 to 43 parts by mass per 100 parts by mass of the powder of the Al source.

<Reductive Nitridation>

In the present invention, the reductive nitridation reaction is carried out by holding the above mixed powder in a nitrogen-containing atmosphere at a temperature of 1620 to 1900° C. for 2 hours or longer.

If the reaction temperature is lower than 1620° C., the nitridation reaction poorly proceeds and even if the nitridation reaction is completed, the AlN particles do not often assume spherical shape or do not grow to a sufficient degree. If the reaction temperature exceeds 1900° C., on the other hand, the rare earth metal compound scatters in short periods of time and an oxynitride (AlON) of a low thermal conductivity is formed. Besides, oxygen easily and solidly dissolves in the AlN particles causing a decrease in the thermal conductivity thereof.

The reaction temperature is, particularly preferably, 1620 to 1800° C.

Further, if the reaction time is shorter than 2 hours, the nitridation reaction does not proceed to a sufficient degree, and the sphericalness of the AlN particles cannot be improved to a sufficient degree.

The reaction time is, particularly preferably, 8 to 20 hours.

The above reductive nitridation may be so conducted that nitrogen diffuses sufficiently in the mixed powder, and is conducted by, for example, a method of filling a carbon setter or the like with the mixed powder and flowing nitrogen therethrough, a method which uses a rotary kiln, or a method which uses a fluidized layer. Among them, particularly preferred is the method that fills the carbon setter with the mixed powder and flows nitrogen therethrough.

<After-Treatment>

In the present invention, the AlN powder obtained through the above reaction contains excess of carbon. It is, therefore, desired to conduct the decarbonization treatment as required.

The decarbonization treatment is to remove carbon by oxidation, and is carried out by using an oxidizing gas. As the oxidizing gas, any gas such as the air or oxygen can be used provided it is capable of removing carbon. From the standpoint of economy and the oxygen concentration in the obtained aluminum nitride, however, the air is preferred. Further, the treating temperature is, usually, 500 to 900° C. and, preferably, 600 to 750° C. by taking into consideration the efficiency of decarbonization and excess of oxidation on the surfaces of the aluminum nitride.

If the oxidizing temperature is too high, the surfaces of the aluminum nitride powder are oxidized to an excess degree often making it difficult to obtain the desired powder. It is, therefore, desired to select a suitable oxidizing temperature and reaction time.

<Aluminum Nitride Powder>

The aluminum nitride (AlN) powder obtained by the above-mentioned method of the invention has a high sphericalness and an average grain size ($D_{50}$) of 6 to 280 μm, preferably, 7 to 150 μm and, more preferably, 8 to 100 μm. Further, the content of coarse particles having a grain size of not less than 5 times as great as the average grain size ($D_{50}$) calculated as volume is not more than 10%, preferably, not more than 5% and, more preferably, not more than 3%.

Further, the lattice constant of the C-axis of the AlN crystals is not less than 4.9800 Å, specifically, not less than 4.9802 Å and, further, not less than 4.9804 Å.

The lattice constant of the C-axis is a value measured by using an X-ray diffraction apparatus and by using Si as an external standard substance, and serves as an index for evaluating the concentration of oxygen solidly dissolved in the AlN particles. Namely, the AlN particles having a larger lattice constant of the C-axis have a lower concentration of oxygen that is solidly dissolved and a higher thermal conductivity. If the lattice constant of the C-axis is not larger than 4.9775 Å, the AlN particles often have a low thermal conductivity.

In the present invention, the sphericalness index of the AlN particles constituting the AlN powder can be expressed by the ratio (DS/DL) of the long diameter and the short diameter thereof. For example, the AlN particles obtained by the present invention has a very high sphericalness (DS/DL) which is not less than 0.75, specifically, not less than 0.80 and, more specifically, not less than 0.85.

The AlN powder (specifically, the one that is decarbonized) of the invention is, as required, pulverized, classified, and is adjusted to possess a desired grain size.

To improve water-resisting property and compatibility to the resin, further, the aluminum nitride particles may be treated for their surfaces by a known method prior to the use. Concretely, there may be conducted a treatment with organo-silicon compound such as silicone oil, silylation agent or silane coupling agent, or with phosphoric acid, phosphate or fatty acid; a treatment for forming a high-molecular film by using a polyamide resin; or a treatment for forming an inorganic film such as of alumina or silica.

<Use>

The above aluminum nitride powder can be put to a variety of applications to utilize the properties of the AlN and, specifically, can be used as a starting material of AlN substrate and filler to be added to the heat radiating materials. For example, the aluminum nitride powder can be widely used as a filler to be added to the heat radiating materials such as heat radiating sheet, heat radiating grease, heat radiating adhesive, coating material and heat conducting resin.

Here, as the resin or grease that serves as the matrix of the heat radiating material, there can be used thermosetting resins such as epoxy resin, epoxy resin to which a mesogenic group is introduced, unsaturated polyester resin, polyimide resin and phenol resin; thermoplastic resins such as polyethylene, polypropylene, polyamide, polycarbonate, polyamide and polyphenylene sulfide; rubbers such as silicone rubber, EPR and SBR; and silicone oils.

Among them, a preferred matrix of the heat radiating material is, for example, an epoxy resin or a silicone resin. To obtain a highly flexible heat radiating material, it is desired to use a liquid silicone rubber of the addition reaction type.

To improve the thermal conductivity of the heat radiating material, it is desired to add the filler in an amount of 150 to 1000 parts by mass per 100 parts by mass of the resin, rubber or oil. In addition to the AlN powder of the invention, the heat radiating material may be, further, filled with any one or a plurality of the fillers such pulverized alumina, spherical alumina, boron nitride, zinc oxide, silicon carbide and graphite inclusive of the AlN powder obtained by a method other than the method of the present invention. The shapes and grain sizes of the AlN powder of the invention and other fillers may be selected depending on the properties and use of the heat radiating material. Usually, the ratio of mixing the AlN powder of the invention and other fillers can be suitably adjusted over a range of from 1:99 to 99:1.

For example, when it is attempted to obtain a heat radiating material having a high thermal conductivity, several kinds of AlN powders obtained by other methods can also be used in combination. Concretely, there can be used in combination the AlN powder of the invention, an AlN powder having a grain size of about 0.1 μm to 500 μm obtained by the reductive nitridation method or the direct nitridation method, and so-called sintered grains obtained by sintering the AlN granules that are obtained by spray-drying the above AlN powders so as to be highly filled in the resins.

When it is attempted to highly fill the resin with the filler, there is preferably employed a method that uses the AlN powder of the invention and several kinds of spherical aluminas of an average grain size of 10 to 100 μm in combination.

When it is desired to impart anisotropy to the thermal conductivity of the heat radiating material, there may be used the AlN powder of the present invention in combination with several kinds of boron nitrides having an average grain size of 1 to 50 μm.

These fillers may have been treated for their surfaces with, for example, a silane coupling agent or the like agent as described above. The heat radiating material may be, further, blended with additives such as plasticizer, vulcanizing agent, cure promoter, parting agent and the like.

The resin composition which is the above heat radiating material can be produced by being mixed using a blender or a mixer. The heat radiating material can be, further, produced by forming the resin composition by the press-forming method, extrusion-forming method, doctor blade method or resin imbibing method followed by heat-curing or photo-curing.

EXAMPLES

The invention will now be described more concretely. It should, however, be noted that the invention is in no way limited to these Examples only. Properties in Examples and in Comparative Examples were measured by the methods described below.

(1) Grain Size.

The average grain size ($D_{50}$) was measured by dispersing the sample in a solution of sodium pyrophosphate by using a homogenizer and by using a laser diffraction grain size distribution meter (MICRO TRAC HRA manufactured by Nikkiso Co.). The secondary grain size (size of aggregated particles) of the powder of the Al source, too, was represented by the average grain size ($D_{50}$).

Further, the primary grain size of the powder of the Al source was measured by using a transmission type electron microscope.

(2) Content of Coarse Particles.

By using a homogenizer, a sample of the AlN powder was dispersed in an aqueous solution of sodium pyrophosphate. Measurement was taken by using the laser diffraction grain size distribution meter (MICRO TRAC HRA manufactured by Nikkiso Co.), and the content of coarse particles having a grain size 5 times as large or more of the average grain size ($D_{50}$) was calculated as volume thereof.

(3) Shape of the Powder.

The shape of the AlN powder was observed by using a scanning type electron microphotograph (S-2600N manufactured by Hitachi, Ltd.).

(4) Lattice Constant of C-Axis of Crystals.

The lattice constant of C-axis of the AlN crystals was measured by using an X-ray diffraction apparatus (RINT-1400, manufactured by Rigaku Co.) and by using Si as an external standard substance.

(5) Ratio of Long Diameter and Short Diameter of Particles.

A hundred particles were arbitrarily selected from the electron microphotographic image of the AlN powder, long diameters (DL) and short diameters (DS) of the particle images were measured by using a scale, and an average value of the ratios (DS/DL) was roughly regarded as the sphericalness.

(6) Content of Cationic Impurities.

The content of cationic impurities (concentration of metal elements) in the AlN powder was determined by melting the AlN powder with an alkali followed by neutralization with an acid, and taking a measurement by using an ICP emission spectroscope (ICPS-7510, manufactured by Shimazu Seisakusho Co.).

(7) Thermal Conductivity of the Silicone Rubber Sheet.

A thermal conductive silicone rubber composition was formed in a size of 10 cm×6 cm and in a thickness of 3 mm, and was heated and cured in a 150° C. hot air circulation-type oven for 1 hour, and was measured for its thermal conductivity by using a thermal conductivity meter (QTM-500 manufactured by Kyoto Denshi Kogyo Co.). To prevent the leakage through the detector portion, measurement was taken via a 10 μm-thick polyvinylidene chloride film.

Example 1

There were used an α-alumina having a primary grain size of 0.3 μm (secondary grain size of 1.1 μm) and a specific surface area of 9.7 m$^2$/g as the Pd source, a carbon black having a specific surface area of 125 m$^2$/g as carbon and an yttrium oxide having an average grain size of 5.0 μm as the rare earth compound.

100 Parts by mass of the α-alumina, 42 parts by mass of the carbon black and 5.0 parts by mass of the yttrium oxide were mixed together, and were filled in a graphite setter.

Next, the mixture was reduced and nitrided in a nitrogen atmosphere under the conditions of a firing temperature of 1700° C. and a firing time of 15 hours.

Thereafter, the oxidation treatment was conducted in the air atmosphere at 700° C. for 12 hours to obtain an AlN powder.

The obtained AlN powder was measured for its average grain size ($D_{50}$), content of coarse particles, lattice constant of the C-axis of the crystals, ratio of the long diameter and the short diameter of the particles, content of cationic impurities and the shape in accordance with the methods described above. The results were as shown in Table 1.

Next,

| | |
|---|---|
| AlN powder | 900 parts by mass, |
| Milable-type silicone | 100 parts by mass |
| (TSE201, manufacture by Momentive Performance Materials Japan Godo Co.), | |
| Parting agent | 0.5 parts by mass, | were kneaded together by using a pressurized kneader. The kneaded product was cooled, mixed with 0.5 parts of a crosslinking agent by using rolls, and was pressed at 180° C. for 15 minutes to obtain a sheet measuring 10 cm high, 6 cm wide and 3 mm thick.

The obtained sheet was measured for its thermal conductivity in accordance with the method described above. The result was as shown in Table 1.

Example 2

An AlN powder was produced in the same method as in Example 1 but using the γ-alumina having a primary grain size of 0.05 μm (secondary grain size of 0.9 μm) and a specific surface area of 230 m$^2$/g as the Al source.

The obtained AlN powder was measured for its properties in the same method as in Example 1. The results were as shown in Table 1.

By using the obtained AlN powder, further, as heat was prepared in the same method as in Example 1 and was measured for its thermal conductivity. The result was as shown in Table 1.

Example 3

An AlN powder was produced in the same method as in Example 1 but conducting the firing at a temperature of 1650° C.

The obtained AlN powder was measured for its properties in the same method as in Example 1. The results were as shown in Table 1.

By using the obtained AlN powder, further, a sheet was prepared in the same method as in Example 1 and was measured for its thermal conductivity. The result was as shown in Table 1.

Example 4

An AlN powder was produced in the same method as in Example 1 but adding the yttrium oxide in an amount of 3.0 parts by mass.

The obtained AlN powder was measured for its properties in the same method as in Example 1. The results were as shown in Table 1.

By using the obtained MN powder, further, a sheet was prepared in the same method as in Example 1 and was measured for its thermal conductivity. The result was as shown in Table 1.

Example 5

An AlN powder was produced in the same method as in Example 1 but adding the yttrium oxide in an amount of 10.0 parts by mass.

The obtained AlN powder was measured for its properties in the same method as in Example 1. The results were as shown in Table 1.

By using the obtained AlN powder, further, a sheet was prepared in the same method as in Example 1 and was measured for its thermal conductivity. The result was as shown in Table 1.

Example 6

An AlN powder was produced in the same method as in Example 1 but adding the carbon black in an amount of 39 parts by mass.

The obtained AlN powder was measured for its properties in the same method as in Example 1. The results were as shown in Table 2.

By using the obtained AlN powder, further, a sheet was prepared in the same method as in Example 1 and was measured for its thermal conductivity. The result was as shown in Table 2.

Example 7

An AlN powder was produced in the same method as in Example 1 but using the yttrium oxide having an average grain size of 35.0 μm as the rare earth compound.

The obtained AlN powder was measured for its properties in the same method as in Example 1. The results were as shown in Table 2.

By using the obtained AlN powder, further, a sheet was prepared in the same method as in Example 1 and was measured for its thermal conductivity. The result was as shown in Table 2.

Example 8

An AlN powder was produced in the same method as in Example 1 but using the α-alumina having a primary grain size of 5.1 μm (secondary grain size of 5.3 μm) and a specific surface area of 0.67 m²/g as the Al source and the yttrium oxide having an average grain size of 35.0 μm as the rare earth compound.

The obtained AlN powder was measured for its properties in the same method as in Example 1. The results were as shown in Table 2.

By using the obtained AlN powder, further, a sheet was prepared in the same method as in Example 1 and was measured for its thermal conductivity. The result was as shown in Table 2.

Example 9

An AlN powder was produced in the same method as in Example 1 but using the α-alumina having a primary grain size of 1.8 μm (secondary grain size of 1.8 μm) and a specific surface area of 0.92 m²/g as the Al source and the yttrium oxide having an average grain size of 11.8 μm as the rare earth compound.

The obtained AlN powder was measured for its properties in the same method as in Example 1. The results were as shown in Table 2.

By using the obtained AlN powder, further, a sheet was prepared in the same method as in Example 1 and was measured for its thermal conductivity. The result was as shown in Table 2.

TABLE 1

|  | Ex. 1 | Ex. 2 | Ex. 3 | Ex. 4 | Ex. 5 |
|---|---|---|---|---|---|
| Al source | | | | | |
| Kind | α-alumina | α-alumina | α-alumina | α-alumina | α-alumina |
| Primary grain size (μm) | 0.3 | 0.05 | 0.3 | 0.3 | 0.3 |
| Rare earth compound | | | | | |
| Kind | $Y_2O_3$ | $Y_2O_3$ | $Y_2O_3$ | $Y_2O_3$ | $Y_2O_3$ |
| Ave. grain size (μm) | 5.0 | 5.0 | 5.0 | 5.0 | 5.0 |
| Coarse ptcl. content (%) | 0.0 | 0.0 | 0.0 | 0.0 | 0.0 |
| Grain size ratio* | 16.7 | 100.0 | 16.7 | 16.7 | 16.7 |
| Blending amount** | 5.0 | 5.0 | 5.0 | 3.0 | 10.0 |
| Carbon | | | | | |
| Blending amount** | 42 | 42 | 42 | 42 | 42 |
| Reductive nitrogenation condition | | | | | |
| Temp. (° C.) | 1700 | 1700 | 1650 | 1700 | 1700 |
| Reaction time (hrs) | 15 | 15 | 15 | 15 | 15 |
| Evaluation of AlN | | | | | |
| Ave. grain size (μm) | 11.2 | 10.3 | 7.6 | 9.5 | 12.8 |
| Coarse ptcl. content (%) | 0.2 | 0 | 0 | 0 | 3.5 |
| Shape | spherical | spherical | spherical | spherical | spherical |
| Lattice const. of C-axis (Å) | 4.9807 | 4.9808 | 4.9802 | 4.9803 | 4.9810 |
| DS/DL | 0.86 | 0.84 | 0.77 | 0.79 | 0.84 |
| Y content (ppm) | 45400 | 43200 | 46000 | 26500 | 89900 |
| Fe content (ppm) | 4 | 5 | 5 | 5 | 2 |
| S content (ppm) | 23 | 25 | 25 | 24 | 26 |
| Heat conductivity of sheet (W/mK) | 9.2 | 9.0 | 8.2 | 8.1 | 9.5 |

*Ave. grain size of rare earth compound/primary grain size of Al source.
**Amount blended (parts by mass) per 100 parts by mass of the Al source.

TABLE 2

|  | Ex. 6 | Ex. 7 | Ex. 8 | Ex. 9 |
|---|---|---|---|---|
| Al source | | | | |
| Kind | α-alumina | α-alumina | α-alumina | α-alumina |
| Primary grain size (μm) | 0.3 | 0.3 | 5.1 | 1.8 |
| Rare earth compound | | | | |
| Kind | $Y_2O_3$ | $Y_2O_3$ | $Y_2O_3$ | $Y_2O_3$ |
| Ave. grain size (μm) | 5.0 | 35.0 | 35.0 | 11.8 |
| Coarse ptcl. content (%) | 0.0 | 0.0 | 0.0 | 0.0 |
| Grain size ratio* | 16.7 | 116.7 | 6.9 | 6.6 |
| Blending amount** | 5.0 | 5.0 | 5.0 | 3.0 |
| Carbon | | | | |
| Blending amount** | 39 | 42 | 42 | 42 |
| Reductive nitrogenation condition | | | | |
| Temp. (° C.) | 1700 | 1700 | 1700 | 1700 |
| Reaction time (hrs) | 15 | 15 | 15 | 15 |

TABLE 2-continued

|  | Ex. 6 | Ex. 7 | Ex. 8 | Ex. 9 |
|---|---|---|---|---|
| Evaluation of AlN |  |  |  |  |
| Ave. grain size (μm) | 14.2 | 84.0 | 76.2 | 22.3 |
| Coarse ptcl. content (%) | 1.5 | 1.0 | 4.6 | 7.4 |
| Shape | spherical | spherical | spherical | spherical |
| Lattice const. of C-axis (Å) | 4.9805 | 4.9802 | 4.9805 | 4.9802 |
| DS/DL | 0.79 | 0.77 | 0.74 | 0.76 |
| Y content (ppm) | 44200 | 45800 | 45200 | 45200 |
| Fe content (ppm) | 4 | 2 | 6 | 4 |
| S content (ppm) | 33 | 32 | 21 | 32 |
| Heat conductivity of sheet (W/mK) | 9.2 | 10.2 | 9.9 | 9.4 |

*Ave. grain size of rare earth compound/primary grain size of Al source.
**Amount blended (parts by mass) per 100 parts by mass of the Al source.

Comparative Example 1

An AlN powder was produced in the same method as in Example 1 but using the yttrium oxide having an average grain size of 1.0 μm as the rare earth compound.

The obtained AlN powder was measured for its properties in the same method as in Example 1. The results were as shown in Table 3.

By using the obtained AlN powder, further, a sheet was prepared in the same method as in Example 1 and was measured for its thermal conductivity. The result was as shown in Table 3.

Comparative Example 2

An AlN powder was produced in the same method as in Example 1 but using the α-alumina having a primary grain size of 7.1 μm (secondary grain size of 7.3 μm) and a specific surface area of 0.25 m²/g as the Al source and the yttrium oxide having an average grain size of 50.2 μm as the rare earth compound.

The obtained AlN powder was measured for its properties in the same method as in Example 1. The results were as shown in Table 3.

By using the obtained AlN powder, further, it was attempted to prepare a sheet in the same method as in Example 1. However, the viscosity was so high that no sheet could be prepared.

Comparative Example 3

An AlN powder was produced in the same method as in Example 1 but using the α-alumina having a primary grain size of 1.8 μm (secondary grain size of 1.8 μm) and a specific surface area of 0.92 m²/g as the Al source and the yttrium oxide having an average grain size of 2.5 μm as the rare earth compound.

The obtained AlN powder was measured for its properties in the same method as in Example 1. The results were as shown in Table 3.

By using the obtained AlN powder, further, it was attempted to prepare a sheet in the same method as in Example 1. However, the viscosity was so high that no sheet could be prepared.

Comparative Example 4

An AlN powder was produced in the same method as in Example 1 but using the α-alumina having a primary grain size of 12.0 μm (secondary grain size of 13.4 μm) and a specific surface area of 0.13 m²/g as the Al source and the yttrium oxide having an average grain size of 20.0 μm as the rare earth compound.

The obtained AlN powder was measured for its properties in the same method as in Example 1. The results were as shown in Table 3.

By using the obtained AlN powder, further, it was attempted to prepare a sheet in the same method as in Example 1. However, the viscosity was so high that no sheet could be prepared.

Comparative Example 5

An AlN powder was produced in the same method as in Example 1 but using the yttrium oxide having an average grain size of 1.6 μm as the rare earth compound.

The obtained AlN powder was measured for its properties in the same method as in Example 1. The results were as shown in Table 3.

By using the obtained AlN powder, further, a sheet was prepared in the same method as in Example 1 and was measured for its thermal conductivity. The result was as shown in Table 3.

Comparative Example 6

An AlN powder was produced in the same method as in Example 1 but using the α-alumina having a primary grain size of 0.1 μm (secondary grain size of 0.5 μm) and a specific surface area of 18.4 m²/g as the Al source and the yttrium oxide having an average grain size of 1.5 μm as the rare earth compound.

The obtained AlN powder was measured for its properties in the same method as in Example 1. The results were as shown in Table 3.

By using the obtained AlN powder, further, a sheet was prepared in the same method as in Example 1 and was measured for its thermal conductivity. The result was as shown in Table 3.

Comparative Example 7

An AlN powder was produced in the same method as in Example 1 but using the α-alumina having a primary grain size of 1.8 μm (secondary grain size of 1.8 μm) and a specific surface area of 0.92 m²/g as the Al source and the yttrium oxide having an average grain size of 10.0 μm as the rare earth compound.

The obtained AlN powder was measured for its properties in the same method as in Example 1. The results were as shown in Table 3.

By using the obtained AlN powder, further, it was attempted to prepare a sheet in the same method as in Example 1. However, the viscosity was so high that no sheet could be prepared.

TABLE 3

|  | Comp. Ex. 1 | Comp. Ex. 2 | Comp. Ex. 3 | Comp. Ex. 4 |
|---|---|---|---|---|
| Al source | | | | |
| Kind | α-alumina | α-alumina | α-alumina | α-alumina |
| Primary grain size (μm) | 0.3 | 7.1 | 1.8 | 12.0 |
| Rare earth compound | | | | |
| Kind | $Y_2O_3$ | $Y_2O_3$ | $Y_2O_3$ | $Y_2O_3$ |
| Ave. grain size (μm) | 1.0 | 50.2 | 2.5 | 20.0 |
| Coarse ptcl. content (%) | 0.0 | 0.0 | 0.0 | 0.0 |
| Grain size ratio* | 3.3 | 7.1 | 1.4 | 1.7 |
| Blending amount** | 5.0 | 5.0 | 5.0 | 5.0 |
| Carbon | | | | |
| Blending amount** | 42 | 42 | 42 | 42 |
| Reductive nitrogenation condition | | | | |
| Temp. (° C.) | 1700 | 1700 | 1700 | 1700 |
| Reaction time (hrs) | 15 | 15 | 15 | 15 |
| Evaluation of AlN | | | | |
| Ave. grain size (μm) | 4.3 | 106.8 | 7.9 | 29.4 |
| Coarse ptcl. content (%) | 14.7 | 19.5 | 12.3 | 15.4 |
| Shape | spherical | irregular | irregular | irregular |
| Lattice const. of C-axis (Å) | 4.9805 | 4.9801 | 4.9802 | 4.9801 |
| DS/DL | 0.82 | 0.65 | 0.71 | 0.64 |
| Y content (ppm) | 44200 | 45600 | 45000 | 44000 |
| Fe content (ppm) | 3 | 6 | 4 | 4 |
| S content (ppm) | 22 | 31 | 32 | 41 |
| Heat conductivity of sheet (W/mK) | 6.7 | — | — | — |

|  | Comp. Ex. 5 | Comp. Ex. 6 | Comp. Ex. 7 |
|---|---|---|---|
| Al source | | | |
| Kind | α-alumina | α-alumina | α-alumina |
| Primary grain size (μm) | 0.3 | 0.1 | 1.8 |
| Rare earth compound | | | |
| Kind | $Y_2O_3$ | $Y_2O_3$ | $Y_2O_3$ |
| Ave. grain size (μm) | 1.6 | 1.5 | 10.0 |
| Coarse ptcl. content (%) | 0.0 | 0.0 | 0.0 |
| Grain size ratio* | 5.3 | 15.0 | 5.6 |
| Blending amount** | 5.0 | 5.0 | 5.0 |
| Carbon | | | |
| Blending amount** | 42 | 42 | 42 |
| Reductive nitrogenation condition | | | |
| Temp. (° C.) | 1700 | 1700 | 1700 |
| Reaction time (hrs) | 15 | 15 | 15 |
| Evaluation of AlN | | | |
| Ave. grain size (μm) | 4.6 | 3.9 | 19.2 |
| Coarse ptcl. content (%) | 10.9 | 2.3 | 10.6 |
| Shape | spherical | spherical | irregular |
| Lattice const. of C-axis (Å) | 4.9804 | 4.9801 | 4.9802 |
| DS/DL | 0.77 | 0.78 | 0.72 |
| Y content (ppm) | 45200 | 43900 | 43200 |
| Fe content (ppm) | 3 | 9 | 5 |
| S content (ppm) | 22 | 38 | 25 |
| Heat conductivity of sheet (W/mK) | 6.9 | 7.2 | — |

*Ave. grain size of rare earth compound/primary grain size of Al source.
**Amount blended (parts by mass) per 100 parts by mass of the Al source.

INDUSTRIAL APPLICABILITY

The AlN powder obtained by the present invention has a shape and a grain size suited for use as a filler and can be highly filled in a matrix such as resin or grease making it possible to obtain a heat radiating sheet, heat radiating gel, heat radiating grease, heat radiating adhesive, phase change sheet and insulating layer of a metal-based substrate that feature high thermal conductivities. Concretely, the AlN powder of the invention works to efficiently transfer the heat from the heat-generating electronic parts such as MPU, power transistor, transformer and the like to the heat-radiating parts such as heat-radiating fins and heat-radiating fans.

The invention claimed is:
1. A method of producing an aluminum nitride powder including following steps of:

preparing a powder of alumina or hydrated alumina having a primary grain size of 0.001 to 6 μm as an Al source, a powder of a rare earth metal compound having an average grain size ($D_{50}$) in a range of 2 to 80 μm, the average grain size ($D_{50}$) thereof being not less than 6 times as great as the primary grain size of said Al source, and a carbon powder, mixing the powder of said Al source, the powder of the rare earth metal compound and the carbon powder together, and reducing and nitriding said Al source by holding the mixed powder in a nitrogen-containing atmosphere at a temperature of 1620 to 1900° C. for not less than 2 hours, wherein the aluminum nitride powder that is produced comprises aluminum nitride particles having a sphericalness expressed by the ratio (DS/DL) of the short diameter (DS) thereof and the long diameter (DL) thereof of not less than 0.75.

2. The method of production according to claim 1, wherein the powder of said rare earth metal element compound is used in an amount of 0.5 to 50 parts by mass and said carbon powder is used in an amount of 35 to 50 parts by mass per 100 parts by mass of said Al source.

3. The method of production according to claim 1, wherein the aluminum nitride powder that is produced has an average grain size ($D_{50}$) of 6 to 280 μm.

* * * * *